United States Patent [19]

Welschof

[11] 4,156,353
[45] May 29, 1979

[54] HOMOKINETIC JOINT ASSEMBLY

[75] Inventor: Hans-Heinrich Welschof, Rodenbach, Fed. Rep. of Germany

[73] Assignee: Löhr & Bromkamp GmbH, Offenbach am Main, Fed. Rep. of Germany

[21] Appl. No.: 814,999

[22] Filed: Jul. 12, 1977

[30] Foreign Application Priority Data

Aug. 11, 1976 [DE] Fed. Rep. of Germany ....... 2636085

[51] Int. Cl.$^2$ ............................................. F16D 3/30
[52] U.S. Cl. ............................................. 64/21; 64/7
[58] Field of Search ................................... 64/21, 8, 7

[56] References Cited

U.S. PATENT DOCUMENTS

| | | | |
|---|---|---|---|
| 2,322,570 | 6/1943 | Dodge | 64/21 |
| 3,324,682 | 6/1967 | Bendler | 64/21 |
| 3,603,111 | 9/1971 | Aucktor | 64/21 |
| 3,785,172 | 1/1974 | Parsons | 64/21 |
| 3,982,840 | 9/1976 | Grosseau | 64/21 |
| 4,019,347 | 4/1977 | Krude | 64/21 |

FOREIGN PATENT DOCUMENTS

| | | | |
|---|---|---|---|
| 2556608 | 7/1976 | Fed. Rep. of Germany | 64/21 |
| 962454 | 7/1964 | United Kingdom | 64/21 |

*Primary Examiner*—Charles J. Myhre
*Assistant Examiner*—R. C. Turner
*Attorney, Agent, or Firm*—Toren, McGeady and Stanger

[57] ABSTRACT

A homokinetic joint assembly for transmitting torque between a pair of shaft members is formed with an outer joint member including an internal cavity defined by an interior wall having grooves formed therein and including generally spherically shaped portions. The arrangement of the grooves is such that each groove of the inner joint member cooperates with the groove of the outer joint member to jointly receive in engagement therebetween one of the ball members, with the respective cooperating grooves of the inner and outer joint members being formed to define therebetween a jaw-like recess for the ball members which expands toward the open side of the internal cavity of the outer joint member. The cage is arranged with its exterior wall guided in the internal cavity of the outer joint member and with its interior wall guided along the exterior wall of the inner joint member. The cage interior wall and the inner member exterior wall are in abutting relationship with each other along portions thereof closest one side of the joint assembly with the inner joint member being reduced in size extending in a direction from said abutting wall portions toward the opposite side of the joint assembly such that the grooves of the inner joint member present a substantially constant depth. The cage exterior wall and the interior wall of the outer joint member are also in abutting relationship along the portions thereof remote from the one side of the joint assembly. The abutting portions of the cage interior and exterior walls with the walls of the inner and outer joint members extend over no more than about two-thirds of the total overlapping dimensions of the walls taken in a direction axially of the joint assembly and on one side of the joint assembly facing toward the opening of said internal cavity of said outer joint member the interior wall of the cage is spaced from the exterior wall of the inner joint member in order to form a lubricant wedge or cone therebetween. On the opposite side of the joint assembly, the exterior wall of the cage is spaced from the interior wall of the outer joint member and in each case the spacing between the wall portions terminates where the wall portions come into abutting relationship.

4 Claims, 4 Drawing Figures

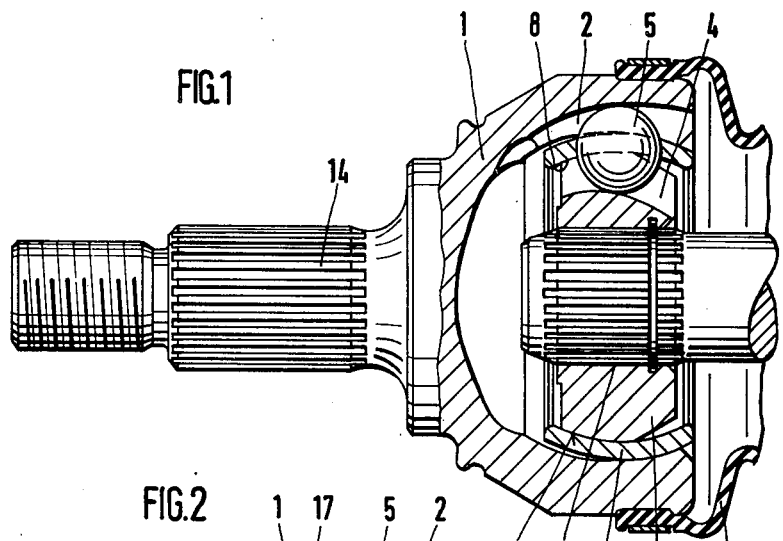
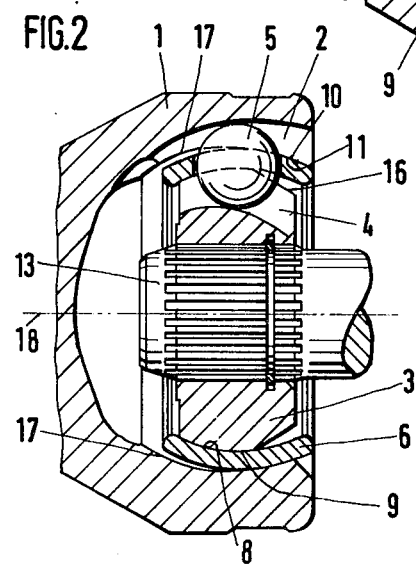

HOMOKINETIC JOINT ASSEMBLY

BACKGROUND OF THE INVENTION

The present invention relates generally to a joint assembly of the type suitable for transmitting torque between a pair of shaft members and the invention is more particularly concerned with a homokinetic joint assembly of the type wherein an inner joint member and an outer joint member have cooperatively interposed therebetween ball members held in a cage which extends concentrically with said inner and outer joint members between an inner surface of the outer joint member and an outer surface of the inner joint member.

Generally, joint assemblies of the type to which the present invention relates include an outer joint member with an inner cavity defined by an interior wall including at least a partially spherical configuration. The interior wall of the outer joint member is formed with grooves which cooperate with complementary grooves formed in the exterior wall of an inner joint member arranged within the cavity of the outer joint member. The grooves of the inner joint member and of the outer joint member correspond in numbers and the arrangement is such that each groove of one of the members cooperates with one groove of the other member to engage therebetween one of the ball members each of which are retained in ball retention apertures of the cage. The cavity of the outer joint member is open on one side thereof and the cooperating grooves of the inner and outer joint members are configured to form a ball member receiving recess which expands in a jaw-like configuration toward the opening direction of the outer joint member cavity. The jaw-like configuration directs the ball members into the angle-bisecting plane. The exterior wall of the cage is generally spherical and is guided in the cavity of the outer joint member while the interior wall of the cage which is also spherical is guided along the spherical outer wall of the inner joint member.

In certain existing prior art joints of the type to which the present invention relates, for example, joints described in German PS No. 1,298,785 or German PS No. 1,267,915, the spherical interior wall of the outer joint member and the spherical exterior wall of the inner joint member present identical overlapping areas with respective cooperating spherical surfaces of the cage. Such arrangements involve the disadvantage that they cannot uniformly insure at all times full lubrication for the co-acting surfaces. If the lubricant film provided in such joint assemblies breaks there may develop a particularly serious risk of damage or of failure of the joint due to the excessive friction which could develop under such circumstances. A further disadvantage of joints of this type resides in the fact that, owing to the varying depth of the grooves which are provided and therefore due to the irregular geometry of the workpiece, the inner joint member can be provided with a duly hardened surface only by means of a very expensive and complicated thermal bath hardening process to produce a tension-fissure and distortion-free workpiece.

Furthermore, in joints of the type involved herein, it has been proposed in the prior art to facilitate the assembly of the joint by extending one of the ball retention apertures of the cage a sufficient distance in the circumferential direction of the cage that the web or spline part of the inner joint member may be inserted through this aperture or recess thereby allowing the inner joint member to be fitted within the cage. This type of approach, in the assembled condition of the joint, leaves only a very small amount of clearance between the exterior surface of the cage and the interior walls of the outer joint member and likewise between the interior surface of the cage and the exterior wall of the inner joint member.

As an alternative to such an extension of one of the cage ball retention apertures, it has also been suggested to make one of the web parts of the inner joint member of an axially shorter length than the remaining webs and than the length of the associated cage ball retention apertures. However, these earlier proposals entail considerable disadvantages because, on the one hand, they result in a significant weakening of the structure of the cage thereby reducing the service life and operational safety of the joint assembly and, on the other hand shortening of one of the web parts may only be obtained by awkward production methods which involve uneconomic cost considerations.

Under such a situation it is the aim of the present invention to provide a non-sliding joint which, as a result of improved lubrication characteristics, is capable of absorbing greater axial forces. Furthermore, it is an aim of the invention to enable the hardening of the inner joint member in a way which is more economically advantageous while at the same time permitting a straightforward assembly of the joint even with a simple cage structure capable of being easily manufactured.

SUMMARY OF THE INVENTION

The present invention involves a homokinetic joint assembly for transmitting torque between a pair of shaft members comprising: an outer joint member having one of said shaft members affixed thereto to extend from one side of said joint assembly, said outer joint member including an internal cavity opening toward the side of said joint assembly opposite said one side, said internal cavity being defined by an interior wall of said outer joint member including generally spherically shaped portions and having grooves formed therein; an inner joint member located within said internal cavity of said outer joint member and having the other of said shaft members affixed thereto to extend from said opposite side of said joint assembly, said inner joint member having an exterior wall including generally spherically shaped portions and grooves formed in said exterior wall which correspond in number to the grooves formed in said interior wall of said outer joint member; a cage extending between said exterior wall of said inner joint member and said interior wall of said outer joint member, said cage including ball retention apertures extending therethrough and being formed with generally spherically shaped interior and exterior concentric wall portions; and ball members operatively engaged between said grooves of said inner and outer joint members and retained within said ball retention apertures to effect transmission of torque between said inner and outer joint members; the arrangement of said grooves being such that each groove of said inner joint member cooperates with a groove of said outer joint member to jointly receive in engagement therebetween one of said ball members, with the respective cooperating grooves of the inner and outer joint members being formed to define therebetween a jaw-like recess for said balls expanding toward the opening of said internal cavity of said outer joint member in the direction of said opposite side of said joint assembly said cage being arranged with said exterior wall thereof being guided in said internal cavity of said outer joint member and with said interior wall thereof being guided along said exterior wall of said inner joint member; said cage interior wall and said inner member exterior wall being in abutting relationship with each other along portions thereof remote from said opposite side of said joint assembly such that said grooves of said inner joint member present a substantially constant depth; said cage exterior wall and said outer joint member interior wall being in abutting relationship along portions thereof remote from said one side of said joint assembly.

By a more specific aspect of the present invention, the abutting portions of said cage interior wall and said inner member exterior wall and the abutting portions of said cage exterior wall and said outer member interior wall extend over not more than two-thirds of the total overlapping dimensions of said walls taken in a direction axially of the joint assembly.

Additionally, the abutting portions of the cage interior wall and the inner member exterior wall are spaced apart along portions thereof closest to said opposite side of said joint assembly to form a generally wedge-shaped gap therebetween. Likewise, the abutting portions of the cage exterior wall and the outer member interior wall are spaced apart along portions thereof closest to said one side of said joint assembly to form a generally wedge-shaped gap therebetween.

As a result of the arrangement of the present invention, the advantage arises that the cage presents no sharp edges which might cause the lubricant film to break. But, owing to the rotationally symmetrical shape of the inner joint member an obtuse angled transitional region is formed in the vicinity of the load bearing concave region of the cage which favors the build up of a lubricant wedge or cone resulting in a continuous lubricant film. Extraction of the inner joint member in the direction of its shaft is prevented by the jaw-like cooperating disposition of the ball grooves in the inner and outer joint members.

Moreover, the cage is strengthened in its structure as a result of the fact that shorter or smaller ball retention apertures may be provided with all of the apertures being of the same length.

A further advantage resides in the fact that the constant depth of the ball grooves equally involves a constant depth of milling or grinding in the formation of these grooves which results in shorter machining times. Additionally, only with grooves of such constant depth can a member be hardened by application of an induction-hardening process.

It is also advantageous that only those parts of the inner and outer joint members require grinding which are actually involved in performing the function of guiding the cage. Moreover, these ground parts require only a single broken edge, the formation of which invariably involves additional expense. Such broken edges allow the introduction of grease and prevent material from being displaced, usually in the upward direction, whereby the cage may jam along its guiding surfaces.

Also, the new contours of the inner joint member no longer require the cage to be equipped with ball retention apertures of unequal length in the circumferential direction in order to permit introduction of the inner joint member into the cage interior. The inner joint member can be inserted into the cage even if the cage retention apertures are all of the same length. This has the advantage that the window or aperture length of the cage, and thus the length over which a grinding operation must be executed, can be shortened while, on the other hand, all of the cage retention apertures may be produced by the same tool thus reducing production costs and improving the stability of the cage.

The invention further provides that the partially spherical areas of the inner and outer joint members, respectively, extended at most over two-thirds of the arc of the associated spherical cage wall.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 1 is a side elevation, partially in section of a homokinetic joint in accordance with the present invention;

FIG. 2 is a sectional view of the essential parts of the joint of FIG. 1;

DETAILED DESCRIPTION OF THE PREFERRED EMBODIMENT

Figure 3:
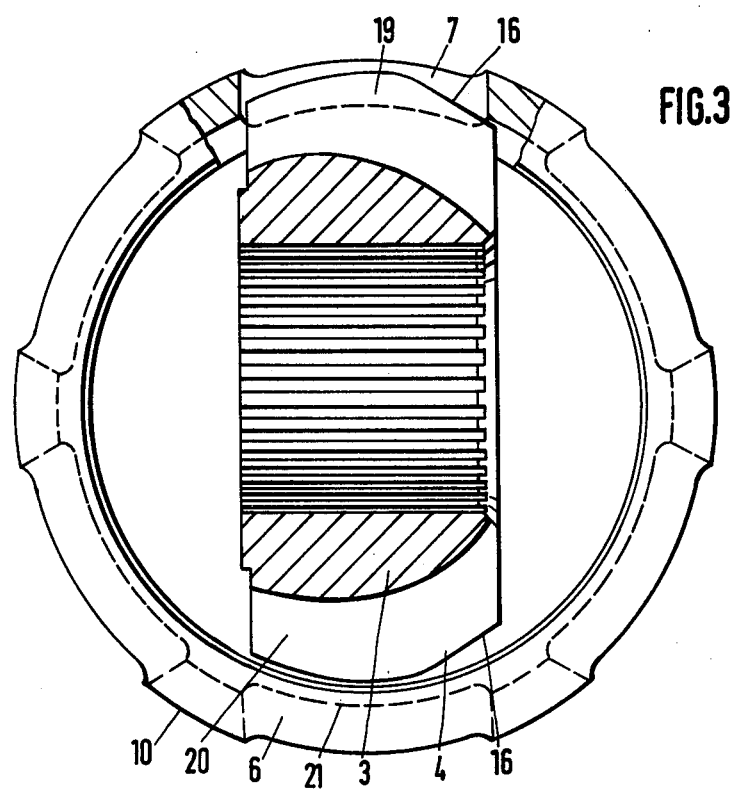
FIG. 3 is a partially sectional view of the cage of the invention with the inner joint member thereof being shown turned through 90° and partially inserted into the cage.

Referring now to the drawings wherein like reference numerals are used to refer to similar parts throughout the various figures thereof, a homokinetic joint assembly embodying the present invention is depicted in FIGS. 1 and 2 as essentially comprising an outer joint member 1 having grooves 2 formed in the interior cavity thereof, and an inner joint member 3 with similar grooves 4 formed on its exterior wall. The joint assembly also comprises ball members or roller elements 5 which are accommodated in pairs of related oppositely disposed grooves 2 and 4.

A cage 6 with ball member retention apertures or window recesses 7 for guiding the ball members 5 is also provided as a part of the overall assembly.

The ball grooves 2, 4 extend in meridial planes relative to the respective axis of the associated joint member, and in each case one groove 2 and one groove 4 of the outer member 1 and of the inner member 3, respectively, form a jaw-like opening to direct the balls into the homokinetic plane of the joint.

The cup-shaped cage 6 for retaining the balls 5 in a non-sliding homokinetic joint of the type illustrated includes an inner cavity 8 defined by an interior wall of the cage with the cage being guided along its interior cavity on an outer spherical wall 9 of the inner joint member 3 while an exterior spherical wall 10 of the cage 6 is guided along inner walls 11 of the outer joint member 1.

The inner joint member 3 further comprises a bore 12 having a splined profile for rotationally rigid engagement therein of a shaft 13.

The joint assembly of the invention operates to transmit torque from the shaft 13 to a second shaft or axle pin 14 by means of the cooperative engagement which is established between the inner joint member 3, the ball members 5 and the outer joint member 1, with the cage 6 being operatively interposed therebetween. The joint assembly is fitted with a protective device such as, for example, a concertina boot 15 which provides a seal against leakage of lubricant and which also acts to prevent penetration of dirt and dust into the interior of the joint assembly.

It will be noted that the outer joint member 1 has the shaft 14 affixed thereto to extend from one side thereof and that the shaft 13 is affixed to the inner joint member 3 to extend from a side thereof opposite said one side. Furthermore, it should be noted that the internal cavity of the outer joint member 1 opens toward said opposite direction of the joint assembly; that is, in the smae direction in which the shaft 13 extends.

The inner joint member 3 is tapered on the side thereof which faces the opening of the outer joint member 1. A spherical surface 16 on the inner joint member does not have contact engagement with the interior hollow cavity 8 of the cage 6, and thus a very good lubricant wedge or cone is permitted to build up in this clearance area. The surface of the tapered spherical portion 16 is not machined. The outer member 1, on the opposite side to its opening, also comprises a face 17 which extends rotationally symmetrically with the central axis 18 and does not contact or engage with an outer spherical wall 10 of the cage. Owing to the special disposition of the grooves, the faces 16 and 17 would not contribute anything to the transmission of axial bearing forces even if they were to have contact engagement with the cage 6.

Figure 4:
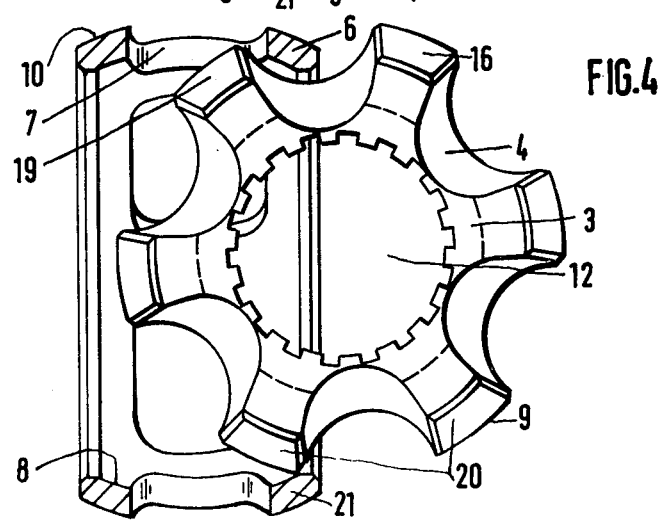
FIG. 4 is a lateral view of the arrangement according to FIG. 3 with the cage being shown in section.

FIGS. 3 and 4 illustrate the manner whereby the inner joint member 3 may be fitted into the cage 6. The close fit of the parts prevents direct axial introduction of the inner joint member 3 into the cage 6, as well as similar introduction of the cage 6 into the outer joint member 1. For this reason, it will be found convenient to first fit the inner joint member 3 into the cage 6 and to subsequently insert this assembled subgroup comprising the cage 6 and the inner joint member 3, as a unit, into the outer joint member 1.

As shown in FIGS. 3 and 4, the inner joint member 3 having a reduced diameter on one side thereof (tapered face 16), is inserted through a ball retention aperture or window recess 7 of the cage 6 in such a manner that the inner joint member 3 may then be conventionally fitted within the cage 6. That is to say, by introduction of one of its web or ridge parts 19, the opposite wedge or ridge portions 20 may be moved clear of the aperture 7 in the opposite cage section 21 so that the webs or ridges 20 may be inserted into the cage.

When the inner joint member 3 has been inserted into the cage 6 and turned in such a manner as to be coaxial therewith, the resulting subassembly unit of the cage 6 and the inner joint member 3 may be readily introduced and fitted into the outer joint member 1.

While a specific embodiment of the invention has been shown and described in detail to illustrate the application of the inventive principles, it will be understood that the invention may be embodied otherwise without departing from such principles.

What is claimed is:

1. A homokinetic joint assembly for transmitting torque between a pair of shaft members comprising: an outer joint member having one of said shaft members affixed thereto to extend from one side of said joint assembly, said outer joint member including an internal cavity opening toward the side of said joint assembly opposite said one side, said internal cavity being defined by an interior wall of said outer joint member including generally spherically shaped portions and having grooves formed therein; an inner joint member located within said internal cavity of said outer joint member and having the other of said shaft members affixed thereto to extend from said opposite side of said joint assembly, said inner joint member having an exterior wall including generally spherically shaped portions and grooves formed in said exterior wall which correspond in number to the grooves formed in said interior wall of said outer joint member; a cage extending between said exterior wall of said inner joint member and said interior wall of said outer joint member, said cage including ball retention apertures extending therethrough and being formed with generally spherically shaped interior and exterior concentric wall portions; and ball members operatively engaged between said grooves of said inner and outer joint members and retained within said ball retention apertures to effect transmission of torque between said inner and outer joint members; the arrangement of said grooves being such that each groove of said inner joint member cooperates with a groove of said outer joint member to jointly receive in engagement therebetween one of said ball members, with the respective cooperating grooves of the inner and outer joint members being formed to define therebetween a jaw-like recess for said balls expanding toward the opening of said internal cavity of said outer joint member in the direction of said opposite side of said joint assembly; said cage being arranged with said exterior wall thereof being guided in said internal cavity of said outer joint member and with said interior wall thereof being guided along said exterior wall of said inner joint member; said cage interior wall and said inner member exterior wall being in abutting relationship with each other along portions thereof remote from said opposite side of said joint assembly and in nonabutting relationship along portions thereof closest to said opposite side with said inner joint member being reduced in size extending in a direction from said abutting wall portions toward said opposite side of said joint assembly such that said grooves of said inner joint member present a substantially constant depth; said cage exterior wall and said outer joint member interior wall being in abutting relationship along portions thereof remote from said one side of said joint assembly, with portions thereof closest to said one side being in nonabutting relationship.

2. An assembly according to claim 1 wherein said abutting portions of said cage interior wall and said inner member exterior wall and said abutting portions of said cage exterior wall and said outer member interior wall extend over not more than two-thirds of the total overlapping dimensions of said walls taken in a direction axially of said joint assembly.

3. An assembly according to claim 2 wherein said abutting portions of said cage interior wall and said inner member exterior wall are spaced apart along portions thereof closest to said opposite said of said joint assembly to form a generally wedge shaped gap therebetween.

4. An assembly according to claim 2 wherein said abutting portions of said cage exterior wall and said outer member interior wall are spaced apart along portions thereof closest to said one side of said joint assembly to form a generally wedge shaped gap therebetween.

* * * * *